No. 12,097. REISSUED MAR. 10, 1903.

C. W. McSHANE.

BOTTLE FOR MEDICINE.

APPLICATION FILED DEC. 17, 1902.

WITNESSES:

Thomas J. McDermott.

Bertie S. Young

Charles W. McShane

INVENTOR.

BY Frank C. Haines

ATTORNEY.

UNITED STATES PATENT OFFICE.

CHARLES W. McSHANE, OF ZANESVILLE, OHIO.

BOTTLE FOR MEDICINE.

SPECIFICATION forming part of Reissued Letters Patent No. 12,097, dated March 10, 1903.

Original No. 710,708, dated October 7, 1902. Application for reissue filed December 17, 1902. Serial No. 135,659.

*To all whom it may concern:*

Be it known that I, CHARLES W. McSHANE, a citizen of the United States, residing at Zanesville, in the county of Muskingum, in the State of Ohio, have invented a new and useful Bottle for Medicine, &c., of which the following is a specification.

My invention relates to a medicine-bottle, and with which I combine a scale of the full, half, and quarter hours from 12 to 11.45 o'clock, together with an indicator to indicate the time of taking the medicine therein contained; and the object of my invention is to provide a practicable, an accurate, and a convenient means of keeping account of the time or times to give one kind or more kinds than one of medicine. I attain this object by the mechanism illustrated in the accompanying drawings, in which—

Figure 1:
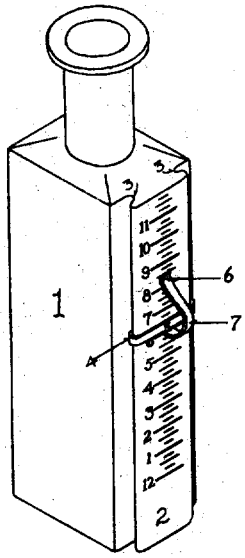
Figure 2:
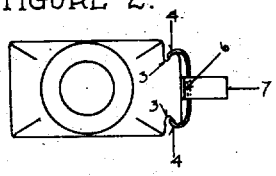
Figure 3:
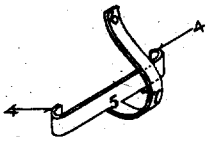
Figure 4:
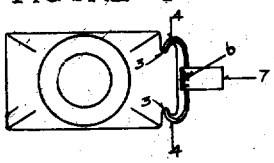

Figure 1 is a perspective view of my invention. Fig. 2 is a horizontal plan view of my invention. Fig. 3 is a perspective view in detail of my time-indicator. Fig. 4 is a horizontal plan view of my invention, showing variation in indicator.

Similar numerals represent similar parts throughout the several views.

1 is a bottle provided on one of its mold-seamed sides along about the line of the seam where the faces of the molds come in contact with each other with a flat-topped ridge 2, provided on its sides with grooves 3, which are adapted to receive gripping-claws 4 of indicator 5, provided with resilient gripping-index 6, which forms toward its base a thumb and finger hold 7. On the top of ridge 2 is located a time-scale of the full, half, and quarter hours from 12 to 11.45 o'clock. Grooves 3 are open at one or both of their ends to receive gripping-claws 4, not by springing said claws over the broad top of ridge 2, but by sliding said claws into the open ends of grooves 3. The inner ends of said claws do not butt squarely up against and grip the innermost surfaces of grooves 3 to help support indicator 5 on ridge 2, but said claws enter grooves 3 without gripping ridge 2 until said indicator 5 is slid so far onto ridge 2 that resilient gripping-index 6 grips the top of said ridge 2, thereby drawing said gripping-claws 4 up against the under sides, respectively, of the edges of ridge 2, which are formed by grooves 3 and the top of said ridge 2, thereby causing gripping-claws 4 to grip from beneath the two edges of said ridge and, together with gripping-index 6 above, adjustably to support indicator 5 on said ridge 2, and said gripping-claws 4 can grip said grooved ridge by butting squarely into said grooves 3, in which case resilient index 6 does not grip the top of said ridge, as shown in Fig. 4. Said ridge 2 can be located on said bottle in any position; but I prefer to form said ridge on a mold-seamed side of said bottle, so that the molds will fall out of grooves 3 and away from ridge 2 without tending to damage said grooves and ridge.

The time-scale can be molded in the top of ridge 2.

The operation of my invention is as follows, to wit: A dose of the medicine in a particular bottle is given, for example, at 7.45 o'clock, to be repeated every three-quarters of an hour. In this case upon giving the dose indicator 5 is moved up the scale until the edge of index 6 stands at the 8.30 o'clock line, thus indicating the next time to repeat the dose.

What I claim as my invention, and desire to secure by Letters Patent, is—

1. The combination with a bottle having a time-scale, of an indicator having claws and index, said claws and index being adapted to grip said bottle and said index being adapted to indicate time on said scale, substantially as described.

2. The combination with a bottle having a time-scale, of an indicator having claws and index and thumb and finger hold, said claws and index being adapted to grip said bottle and said index being adapted to indicate time on said scale, substantially as described.

3. The combination with a bottle having a time-scale, of an indicator having claws and index, said claws being located out of the plane passing transversely through said index at its point adapted to grip said bottle, thereby adapting said claws to take their position on said bottle in advance of said gripping-point of said index, and not to grip said bottle until said gripping-point of said index grips said bottle, said indicator being adapted to indicate time on said scale, substantially as described.

4. The combination with a bottle having a ridge provided with grooves and having a time-scale, of an indicator having claws and index, said claws being adapted to bear in said grooves and to grip said ridge, and said index being adapted to indicate time on said scale, substantially as described.

5. The combination with a bottle having a ridge provided with grooves and having a time-scale, of an indicator having claws and index, said claws being adapted to bear in said grooves and to bear up under their flanges, and said index being adapted to bear upon said ridge, said claws and index being thereby adapted to grip said ridge, and said index being adapted to indicate time on said scale, substantially as described.

6. The combination with a bottle having a time-scale and a grooved ridge, the grooves thereof having open ends, of an indicator having claws adapted to enter said open ends of said grooves and to grip said ridge and said indicator being adapted to indicate time on said scale, substantially as described.

7. The combination with a bottle having a time-scale and a grooved ridge, the grooves thereof having open ends, of an indicator having claws and index, adapted to grip said grooved ridge, said claws being adapted to enter said open ends of said grooves without gripping said ridge, until said index grips said ridge, said index being adapted to indicate time on said scale, substantially as described.

8. The combination with a bottle having a ridge provided with grooves and having a time-scale, of an indicator having a bent-up, integrally-formed thumb and finger hold, and having claws and index, said claws being adapted to bear in said grooves and to grip said ridge, and said index being adapted to indicate time on said scale, substantially as described.

9. The combination with a bottle having a time-scale and a grooved ridge, the grooves thereof having open ends, of an indicator having a thumb and finger hold, and having claws and index adapted to grip said grooved ridge, said claws being adapted to enter said open ends of said grooves without gripping said ridge until said index grips said ridge, and said index being adapted to indicate time on said scale, substantially as described.

In testimony whereof I have signed my name to this specification in the presence of two subscribing witnesses.

CHARLES W. McSHANE.

Witnesses:
BERTIE S. YOUNG,
THOMAS J. McDERMOTT.